(12) United States Patent
Rien et al.

(10) Patent No.: US 7,986,504 B2
(45) Date of Patent: Jul. 26, 2011

(54) DISTRIBUTING POWER TO AN INTEGRATED CIRCUIT

(75) Inventors: Mikael Rien, Saint Ismier (FR); Fabrice Blanc, Vinay (FR); Nidhir Kumar, Bangalore (IN)

(73) Assignee: ARM Limited, Cambridge (GB)

( * ) Notice: Subject to any disclaimer, the term of this patent is extended or adjusted under 35 U.S.C. 154(b) by 232 days.

(21) Appl. No.: 12/457,208

(22) Filed: Jun. 3, 2009

(65) Prior Publication Data

US 2010/0244564 A1 Sep. 30, 2010

(30) Foreign Application Priority Data

Mar. 24, 2009 (IN) .............................. 557/DEL/2009

(51) Int. Cl.
*H02H 9/00* (2006.01)
(52) U.S. Cl. .......... 361/91.1; 361/56; 361/736; 361/764
(58) Field of Classification Search ................ 361/91.1, 361/56, 736, 764; 257/775, 203
See application file for complete search history.

(56) References Cited

U.S. PATENT DOCUMENTS

| | | | | |
|---|---|---|---|---|
| 6,798,069 | B1 * | 9/2004 | Ali et al. | 257/775 |
| 2002/0133786 | A1 * | 9/2002 | Weis | 716/1 |
| 2003/0235019 | A1 * | 12/2003 | Ker et al. | 361/56 |
| 2008/0164324 | A1 * | 7/2008 | Song | 235/492 |

* cited by examiner

*Primary Examiner* — Patrick Salce
(74) *Attorney, Agent, or Firm* — Nixon & Vanderhye P.C.

(57) ABSTRACT

A power supply cell for distributing power supplied from a first voltage supply to an integrated circuit is disclosed. The power supply cell comprises: a layer comprising conductive material, the conductive material providing a conduction path for current flowing from the first voltage supply to a portion of the integrated circuit to be powered and further providing a protection path for surge current flowing between the first voltage supply and an electrostatic discharge protection device and between the electrostatic discharge protection device and the second voltage supply; the conductive material forming a first conduction path for providing a path for current flowing between the first voltage supply and the portion of the integrated circuit to be powered and for providing a portion of the protection path for surge current flowing between the first voltage supply and the electrostatic discharge protection device and a second conduction path for providing a further portion of the protection path for surge current flowing between the second voltage supply and the electrostatic discharge protection device; wherein the conductive material is arranged such that the first conduction path has a significantly lower resistance than the second conduction path.

17 Claims, 9 Drawing Sheets

Core side

Edge of the die — Pitch

DISTRIBUTING POWER TO AN INTEGRATED CIRCUIT

BACKGROUND OF THE INVENTION

1. Field of the Invention

The field of the invention relates to integrated circuits and in particular to supplying power to the integrated circuits.

2. Description of the Prior Art

With advances in semiconductor technology, semiconductor chips are getting ever smaller and a limiting factor to the decrease in the size of the device is now often the size of the area required to bond a wire to the device so that external signals and power can be supplied to the device. Such chips are termed pad limited and over 90% of chips now fall within this category.

The minimum width of the area required to bond a wire to a device is termed the pitch of the device. When supplying power to a semiconductor core a power pad is used to provide a connection between the wire bonded to the device and the core. Cores need to be protected from electrostatic discharge which can cause surge currents and local heating of the device, and this is done using ESD (electrostatic discharge) clamps within the power pads that are supplying the power.

These power pads or power cells have metal strips that connect the power line bonded to the outside of the power pad to the core. However, in order to provide the required ESD protection these metal strips are also used to provide connections to the ESD clamps. FIG. 1a shows the metal strips of a power pad of the prior art, FIG. 1b shows a circuit diagram of a $V_{DD}$ power pad of the prior art, and FIG. 1c shows a cross section of this power pad.

As can be seen from FIG. 1c on the top there is a bonding layer 10 where a metal wire 8 is bonded to the power pad, then in the next layer there are the power rails of the integrated circuit that run around the edge of the integrated circuit. These are shown schematically as being arranged one on top of the other, but are in reality arranged side by side. Power rail 12 is connected to $V_{SS}$ at least one other power cell via a wire bonded to this cell at bonding layer 10, and power rail 14 is connected to $V_{DD}$ via wire 8 at this power cell and possibly at other power cells too. There is then the metallisation layer comprising metal strips 16 (shown in FIG. 1a). Some of these metal strips are connected to $V_{DD}$ via the bonding layer and take the power from this layer to the core of the integrated circuit. Only half of the metal strips of this layer are connected to VDD however, the other half are connected to the $V_{SS}$ rail and are used for electrostatic discharge protection. Thus, the ESD clamp 18, which in this embodiment is a large transistor in the lower layers is connected between $V_{SS}$ and $V_{DD}$ via the metal rails of the metallisation layer 16 and this large transistor provides a power surge current path to protect the integrated circuit.

As noted above as devices are getting smaller they are becoming limited by the pitch of the device and this is determined by the width required to bond a wire. Furthermore, as this gets smaller, the metal strips in the metallisation layer 16 for supplying current to the cell also need to get correspondingly smaller, thereby restricting the amount of current that can be supplied. It would be desirable to be able supply more current to a core without increasing the number of power pads.

SUMMARY OF THE INVENTION

A first aspect of the present invention provides a power supply cell for distributing power supplied from a first voltage supply to an integrated circuit, said power supply cell comprising: a layer comprising conductive material, said conductive material providing a conductive path for current flowing from said first voltage supply to a portion of said integrated circuit to be powered and further providing a protection path for surge current flowing between said first voltage supply and an electrostatic discharge protection device and between said electrostatic discharge protection device and said second voltage supply; said conductive material forming a first conduction path for providing a path for current flowing between said first voltage supply and said portion of said integrated circuit to be powered and for providing a portion of said protection path for surge current flowing between said first voltage supply and said electrostatic discharge protection device and a second conduction path for providing a further portion of said protection path for surge current flowing between said second voltage supply and said electrostatic discharge protection device; wherein said conductive material is arranged such that said first conduction path has a significantly lower resistance than said second conduction path.

The present invention recognises that although there is a technical prejudice for providing symmetrical power cells with resistance paths that are the same between the first voltage supply and the second voltage supply to provide the electrostatic discharge protection, this is not actually necessary and as the power supply is for providing power from the first voltage supply, it is desirable to lower the resistance paths from the first voltage supply cell with respect to the resistance of the second voltage supply cell. Thus, a power supply cell that is not symmetric is provided and which has an increased capacity for supplying power to the portion of the integrated circuit that is to be powered.

In some embodiments, said first conduction path has a resistance of between 10 and 90% of said second conduction path, while in other embodiments said first conduction path has a resistance of between 30 and 70% of said second conduction path.

Clearly the lower the resistance of the first conduction path with respect to the second conduction path the more power that the power supply cell can supply. However, there is a limit as these conduction paths need to carry the surge current that is produced by an electrostatic discharge. Clearly, if they have too high a resistance then they will degrade under the surge current and will not work. Thus, a suitable resistance for the second conduction path is required.

In some embodiments, said conductive material comprises a plurality of conductive strips, said first conduction path comprising more conductive strips than said second conduction path.

Although the conductive material can have a number of forms, in many embodiments it may comprise a plurality of conductive strips. Conductive strips are often used to form these conduction paths as during the manufacturing processes where the wafer is polished, conductive strips generally are not deformed as much as larger conducting blocks by the polishing process. In a device where conductive strips are used, a simple way of changing the resistance in one conduction path with respect to the other is by changing the number of conductive strips in the respective paths.

Alternatively and/or additionally, in some embodiments said conductive strips have different widths, said second conduction path being formed of at least one conductive strip that is thinner than at least one of said conductive strips forming said first conduction path.

In some embodiments, the width of the conductive strips can be changed so that the second conduction paths have thinner strips and the first conduction path is formed of thicker strips. The number of strips may also vary.

In some embodiments, a width of said at least one conductive strip forming said second conduction path is selected to be narrow, but wide enough not to degrade when conducting said surge current.

As noted previously, there is a lower limit to the width that the conductive strip(s) forming a second conduction path can have, and in some embodiments the strip is selected to be narrow but not too narrow to degrade when conducting the surge currents.

In some embodiments, said conductive material is arranged such that a total resistance of said first conduction path and said second conduction path is less than a predetermined value such that electrostatic discharge protection is provided.

In order to allow the dissipation of any electrostatic discharge, a protection path that has a low enough resistance to allow a surge current to flow without damaging the device is needed. To meet this requirement the total resistance of the first conduction path and the second conduction path must be less than a predetermined value. Provided that this requirement is met then a suitable electrostatic discharge protection will be provided and thus, the relative resistances of the first and second conduction paths with respect to each other can be varied as long as the overall resistance meets this requirement.

In some embodiments, a width of said portion of said power supply cell comprising said conductive material is greater than a pitch width of said integrated circuit, said pitch width of said integrated circuit being a minimum distance between external connections to said integrated circuit.

There is a technical prejudice to provide power supply cells with a width that is equal to the pitch width of the integrated circuit as it is felt that making them any wider will increase the size of the integrated circuit. Much work has been done to reduce the pitch size and therefore, engineers are very reluctant to provide an input/output cell that is wider than this pitch width. However, it has been found that widening the portion of the power supply cell that is the portion comprising the conductive material to be greater than a pitch width of the integrated circuit can be done without affecting the size of the integrated circuit. In this way, additional power can be supplied to the integrated circuit. Furthermore, if the cell before widening provided the required resistance for electrostatic discharge protection then the additional width provided can be used solely for providing conductive material to the first voltage supply cell, thereby the additional area is all used for current supply increasing the efficiency of the power supply cell and thereby reducing a number of power supply cells that are needed to power the integrated circuit.

In some embodiments, said conductive material for providing said second conduction path takes up half or less than half said pitch width of said integrated circuit.

As noted above, when the cell is widened in this way the additional area can be used solely for the first conduction path. Thus, the second path will take up half or less than half the pitch width of the integrated circuit.

The power supply cell can be for supplying power to a number of elements within the integrated circuit, it can be for supplying power to a core within the integrated circuit for example, or for supplying power to an input/output device such as a USB port. It should be noted that input/output devices generally have higher power requirements than cores and it may be that the power supply cell is connected to a first voltage supply that has a higher value than would be the case were the power supply cell supplying a voltage to the core.

In some embodiments, said power supply cell further comprises a bonding layer for receiving a conducting element for connecting with said first voltage supply; a power line layer comprising first and second conductive strips for connecting to said first and said second voltage supply respectively; at least one layer comprising said electrostatic discharge protection device; wherein said layer comprising said conductive strips is arranged between said power line layer and said at least one layer comprising said electrostatic discharge protection device, said first conduction path having connections to said bonding layer, said portion of said integrated circuit to be powered and said electrostatic discharge protection device and said second conduction path having connections to said second conductive strip.

In some embodiments, said width of said outer surface of said bonding layer is equal to a pitch of said integrated circuit, and said width of said portion of said cell comprising said conductive materials is wider than said pitch.

Although, it may be desirable to increase the width of the portion of the power supply cell that comprises the conductive material, it is advantageous if the outer bonding layer portion of the cell is not widened. In this way, the space required for the input/output cells to be attached to the integrated circuit is not increased. In fact it may be decreased as fewer power supply cells may be needed.

A second aspect of the present invention provides an integrated circuit comprising a core and a power rail layer, said power rail layer comprising a first conductive rail for connecting to said first voltage supply and a second conductive rail for connecting to said second voltage supply said power rails running around an edge of said integrated circuit, said integrated circuit further comprising at least one power supply cell according to an embodiment of the present invention, said power supply cell being formed towards said edge of said integrated circuit and including a portion of said power rails, said first conductive rail connecting to said first voltage supply within said power supply cell.

A third aspect of the present invention provides an integrated circuit comprising a core and at least one power supply cell according to a first aspect of the present invention, and further comprising at least one power supply cell for supplying power from a second voltage supply to a portion of said integrated circuit to be powered, said power supply cell comprising: a layer comprising conductive material, said conductive material providing a conduction path for current flowing from said first voltage supply to a portion of said integrated circuit to be powered and further providing a protection path for surge current flowing between said second voltage supply and an electrostatic discharge protection device and between said electrostatic discharge protection device and said first voltage supply; said conductive material forming a third conduction path for providing a path for current flowing between said second voltage supply and said portion of said integrated circuit to be powered and for providing a portion of said protection path for surge current flowing between said second voltage supply and said electrostatic discharge protection device and a fourth conduction path for providing a further portion of said protection path for surge current flowing between said first voltage supply and said electrostatic discharge protection device; wherein said conductive material is arranged such that said third conduction path has a significantly lower resistance than said fourth conduction path.

The integrated circuit may of course comprise a number of power supply cells, for supplying power from two different voltages, these being the high and low voltage levels of a core for example, it should be noted that one of these levels could be ground. Some of the power supply cells may also be for supplying different voltage levels to different devices within the integrated circuit that require different power levels.

A fourth aspect of the invention provides a method of distributing power supplied from a first voltage supply to an integrated circuit, said method comprising the steps of: providing said integrated circuit with a layer comprising conductive material, said conductive material providing a conductive path for current flowing from said first voltage supply to a portion of said integrated circuit to be powered and further providing a protection path for surge current flowing between said first voltage supply and an electrostatic discharge protection device and between said electrostatic discharge protection device and said second voltage supply; arranging said conductive material to form a first conduction path for providing a path for current flowing between said first voltage supply and said portion of said integrated circuit to be powered and for providing a portion of said protection path for surge current flowing between said first voltage supply and said electrostatic discharge protection device and a second conduction path for providing a further portion of said protection path for surge current flowing between said second voltage supply and said electrostatic discharge protection device such that said first conduction path has a significantly lower resistance than said second conduction path.

A fifth aspect of the present invention provides a power supply cell for distributing power supplied from a first voltage supply to an integrated circuit, said power supply cell comprising: a layer comprising conductive material, said conductive material providing a conduction path for current flowing from said first voltage supply to a portion of said integrated circuit to be powered and further providing a protection path for surge current flowing between said first voltage supply and an electrostatic discharge protection device and between said electrostatic discharge protection device and said second voltage supply; said conductive material forming a first conduction path for providing a path for current flowing between said first voltage supply and said portion of said integrated circuit to be powered and for providing a portion of said protection path for surge current flowing between said first voltage supply and said electrostatic discharge protection device and a second conduction path for providing a further portion of said protection path for surge current flowing between said second voltage supply and said electrostatic discharge protection device; wherein said conductive material is arranged such that said first conduction path has a significantly lower resistance than said second conduction path; and a width of said portion of said power supply cell comprising said conductive material is greater than a pitch width of said integrated circuit, said pitch width of said integrated circuit being a minimum distance between external connections to said integrated circuit.

The above, and other objects, features and advantages of this invention will be apparent from the following detailed description of illustrative embodiments which is to be read in correction with the accompanying drawings.

DESCRIPTION OF THE PREFERRED EMBODIMENTS

Figure 1A:
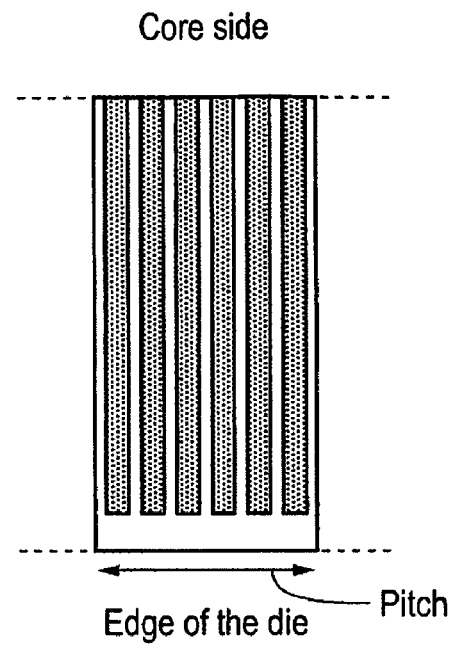
FIGS. 1a, 1b and 1c show various views of a power supply cell according to the prior art.
Figure 1B:
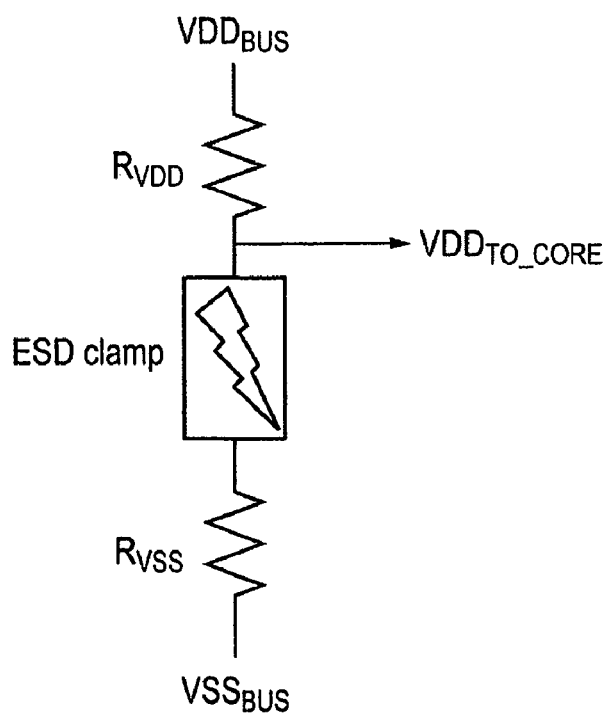
Figure 1C:
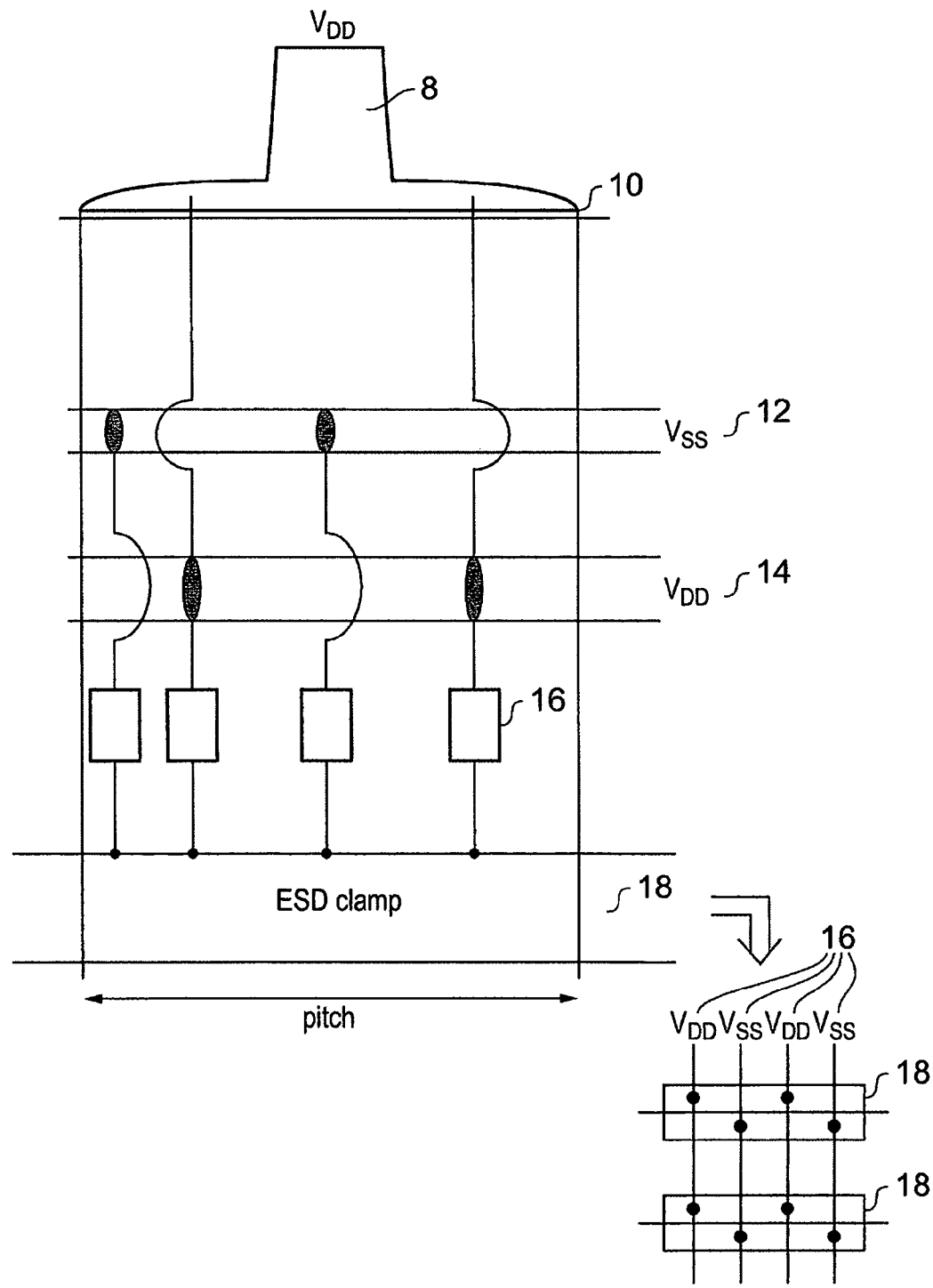
Figure 2:
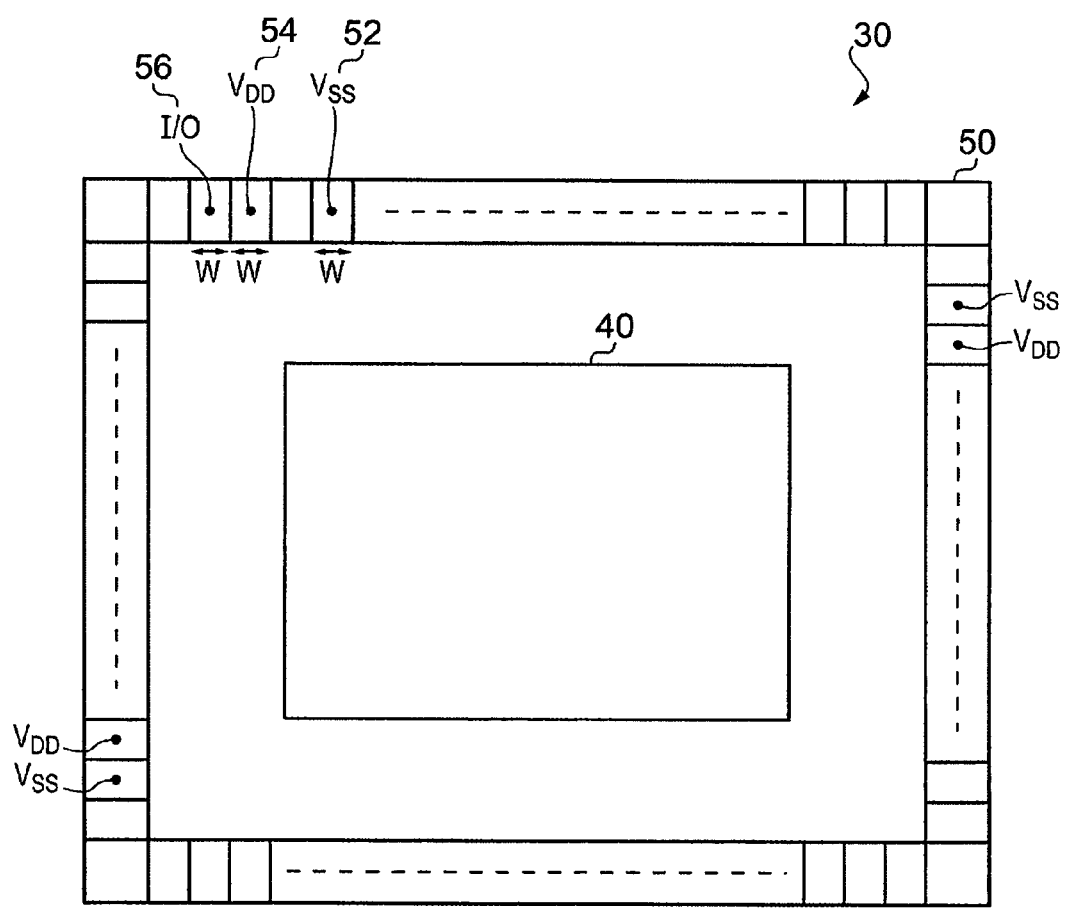
FIG. 2 shows an integrated circuit and power supply cells.

FIG. 2 shows an integrated circuit 30 that comprises a core 40 and an input/output loop 50 that comprises power cells 52 and 54 and the input/output cell 56. Power cell 52 is connected to a low voltage power supply VSS, while power cell 54 is connected to a high level voltage supply VDD. Each of these cells are a width w wide which is the pitch of the device and is the minimum width for providing bonding of a wire. In many integrated circuits nowadays this is the determining factor in size and for this reason the core 40 lies well within this input/output loop.

Figure 3:
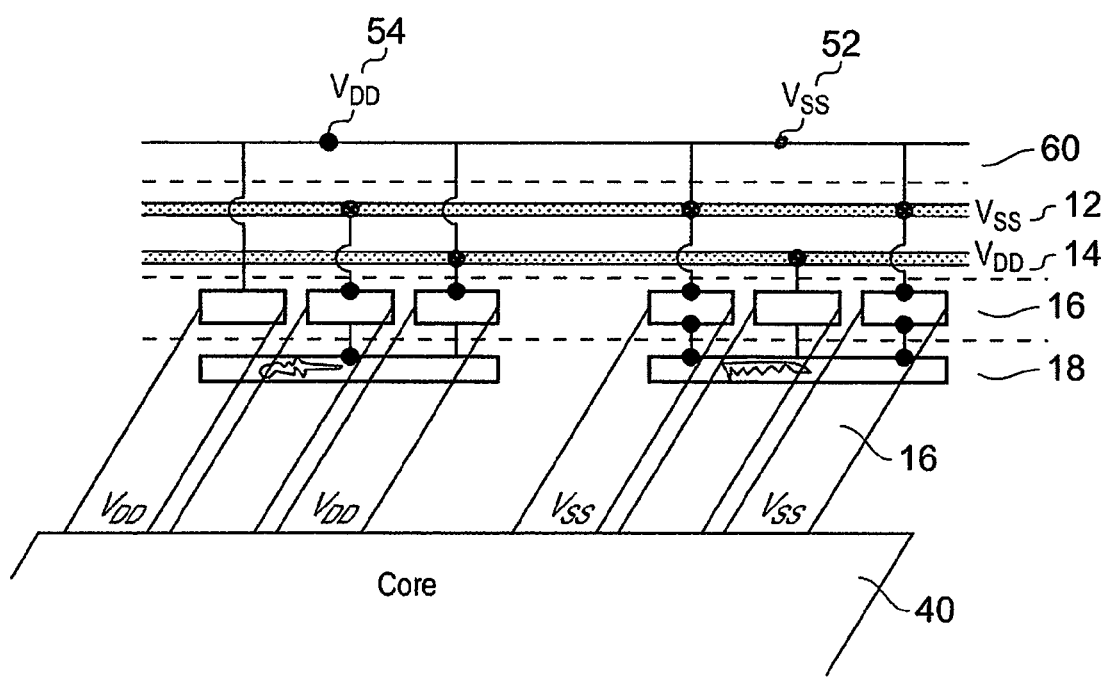
FIG. 3 shows a cross sectional view of two power supply cells according to an embodiment of the present invention.
Figure 4:
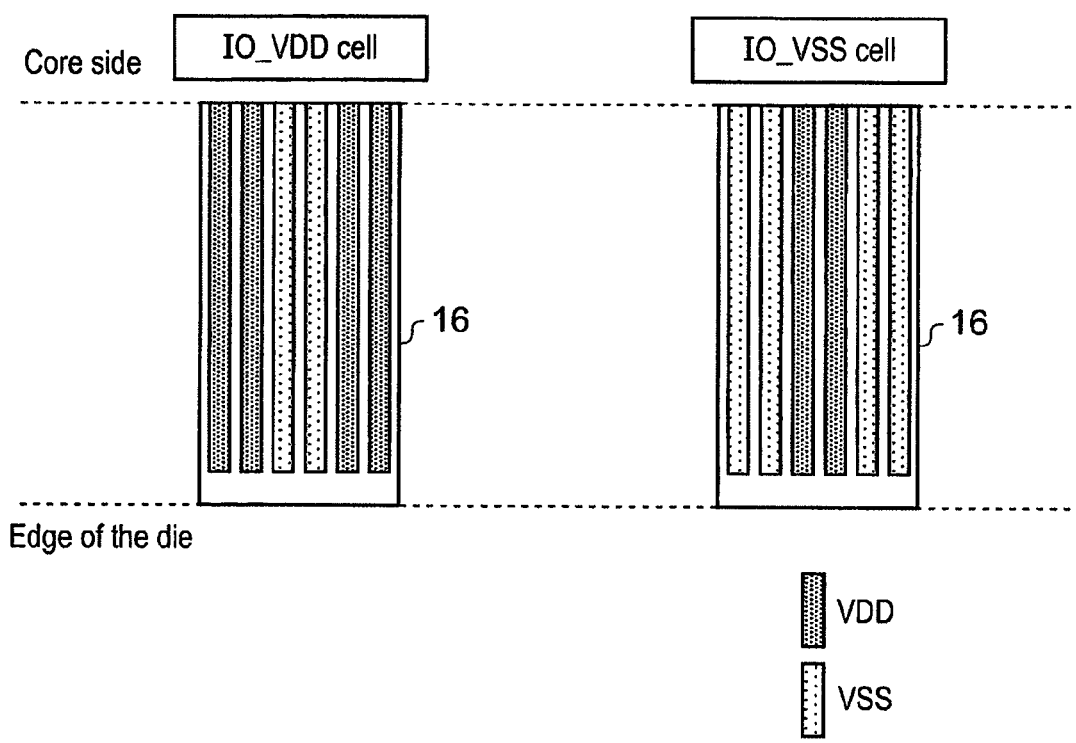
FIG. 4, shows the metallisation layers within power supply cells of an embodiment of the present invention.

The power cells 52 and 54 have several layers and FIG. 3 shows one of these cells schematically in cross section. There is a top layer which is the bonding layer 60 to which the wires are bonded. There is then the layer that the power rails lie in. These are rails 12 and 14 that carry VSS and VDD around the loop of the cell. The next layer down is the layer providing the metallisation contacts that take the power from the power pad or cell to the core 40 itself. These are shown in greater detail in FIG. 4. In the next layers 18 there is a surge current protection device or ESD clamp that protects the core 40 from power surges due to electrostatic discharge. The metallisation strips 16 are connected to this ESD clamp 18. Some of the metallisation strips 16 are also connected to the power supply connected via the bonding layer 60 and different strips are connected to each of the two power rails. In this way, they provide a path from the high level voltage supply to the low level voltage supply through the ESD clamp.

In this embodiment, there are two metallisation strips that provide a conducting path from VDD to the core and to the ESD clamp and one that provides a conducting path from the VSS rail to the ESD clamp 18. Thus, there are more metal strips for conducting VDD and hence a lower resistance path is provided by these strips. This allows more current to flow from the power supply to the core. This is shown in more detail in FIG. 4 where in fact there are six metallisation rails shown of which four are connected to VDD and two to VSS.

Figure 5:
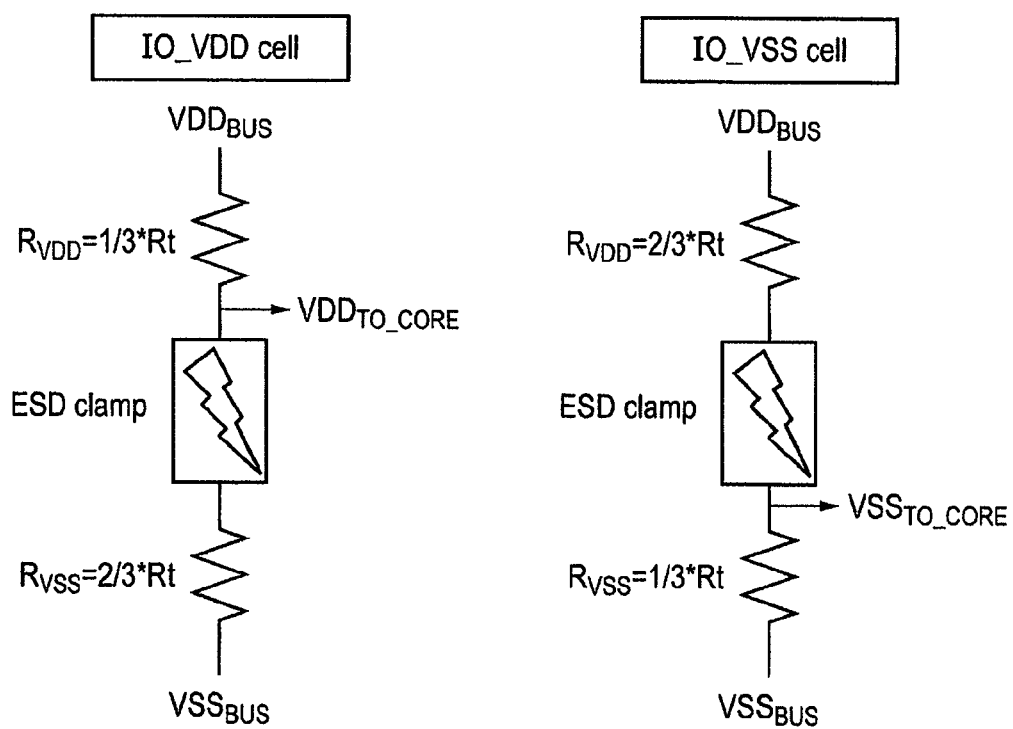
FIG. 5 shows schematically shows in circuit diagram form the principle of the present invention.

It is important that the sum of the resistance of these metal strips between the VDD source and the ESD device plus the resistance of the metal strips between the VSS rail and the ESD device is equal to or greater than a minimum value that is required to provide sufficient electrostatic discharge protection for the device. Provided that this minimum value for the sum of resistances is met then it is not important that the two resistances are equal and this has been used in embodiments of the present invention to provide a lower resistance to the useful connection path that is the connection path that is also used for supplying power to the core. This is done in this embodiment by providing more metal strips for this path. Thus, the VDD and VSS strips are unbalanced, but the sum of their widths remains the same so that $R_{VDD}+R_{VSS}$ remain constant. Thus, the ESD performance of the clamp remains the same. This is shown in circuit form in FIG. 5 for both a VSS and VDD cell.

It should be noted that although in this embodiment the VDD path is the power supplying path and given the lower resistance, it would be clear to a skilled person that in the case where the VSS path is the power supplying path then this should be given the lower resistance.

In some embodiments rather than changing the number of strips, the resistance is varied by changing the width of the strips. The limitation of the metal line widths of the strips is the point at which the metal line starts to become nonlinear which would at the end increase the sum of the resistances, so there is a limit to the amount of unbalancing that can be done. Thus, when unbalancing the cells by changing the widths of the strips, the ideal ratio of the two resistances is the largest one that does not go beyond the start of the nonlinearity of the smallest of the two resistances. Furthermore, the width should not be too narrow that it degrades when conducting the surge current.

Figure 6:
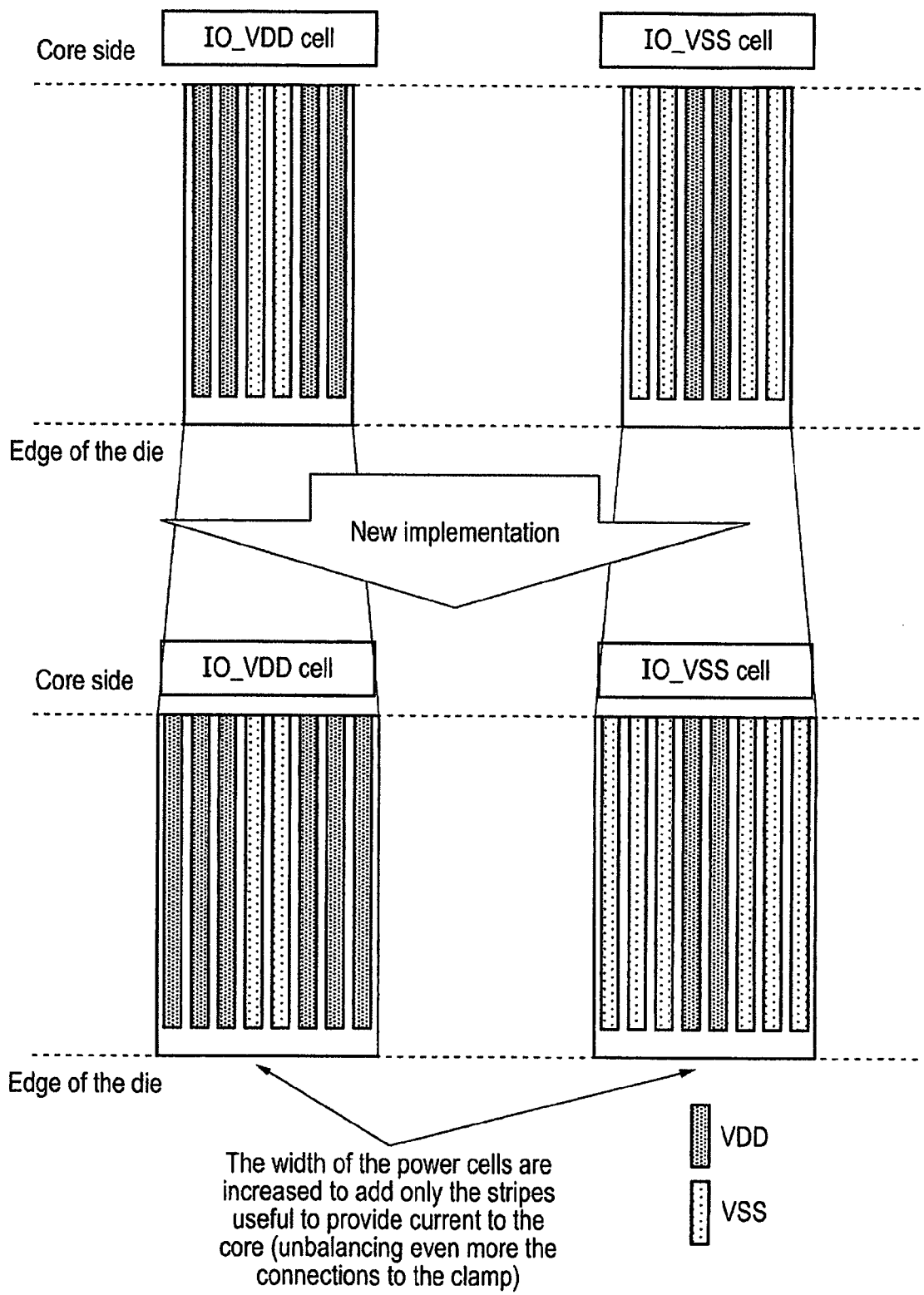
FIG. 6 shows the metallisation layers within a power supply cells of a further embodiment of the present invention.

FIG. 6 shows an alternative embodiment of the present invention where layer 16 comprising the metal layers is widened to beyond that of the pitch. If this layer of the power cell is widened in this way, any additional metal strips that are provided in this widened area can be metal strips for supplying power to the core as there are already sufficient metals strips to provide the resistance needed for the ESD clamp within the pitch of the cell. In this way the device is widened and all the extra width is used for metal strips for providing power. This is highly advantageous.

It should be noted that although this layer is widened, the top bonding layer remains the same size and thus, the pitch, w, which is the width required to bond a wire to the device of the device is not changed. This is possible because this layer is not used in some of the cells on the outer edge of the integrated circuit and thus, it can be widened provided it is not next to another power cell.

In the example shown in FIG. 6 two metal strips are added in each power cell which is an increase in width of 2/6=⅓. However, the increase in power delivered to the core is 50% as the number of useful strips added is 2 whereas previously there were only 4 of these.

By providing power in this way, the number of power cells required to deliver a certain amount of current is reduced and thus, the size of the chip can also be reduced.

It should also be noted that by not providing equal resistance with the VDD and VSS lines for the ESD device, the level of resistance for the conduction paths to the ESD device is designed for the highest allowable resistance which still protects the device, any extra conduction paths being given to the conduction path that also supplies the power. Thus, the resistance of the path to the ESD device is now designed with that device in mind, rather than just being the path for supplying power and a corresponding path for the other voltage level. In this way, the resistance of the path to the ESD device is increased and therefore leakage currents through this device are reduced.

Although embodiments of the invention are shown for devices with two power supplies VDD and VSS, it will be clear to a skilled person that this technique can also be applied to cases with multiple power supplies and multiple grounds. In such embodiments there are several power rails that run through the layer under the bonding layer and the power cells are arranged to connect to the two power rails that relates to the power supply that they are connected to via the bonding layer. Thus, in FIG. 3, in addition to VSS rail 12 and VDD rail 14, this layer will have a further VSS1 rail and a VDD1 rail.

Figure 7:
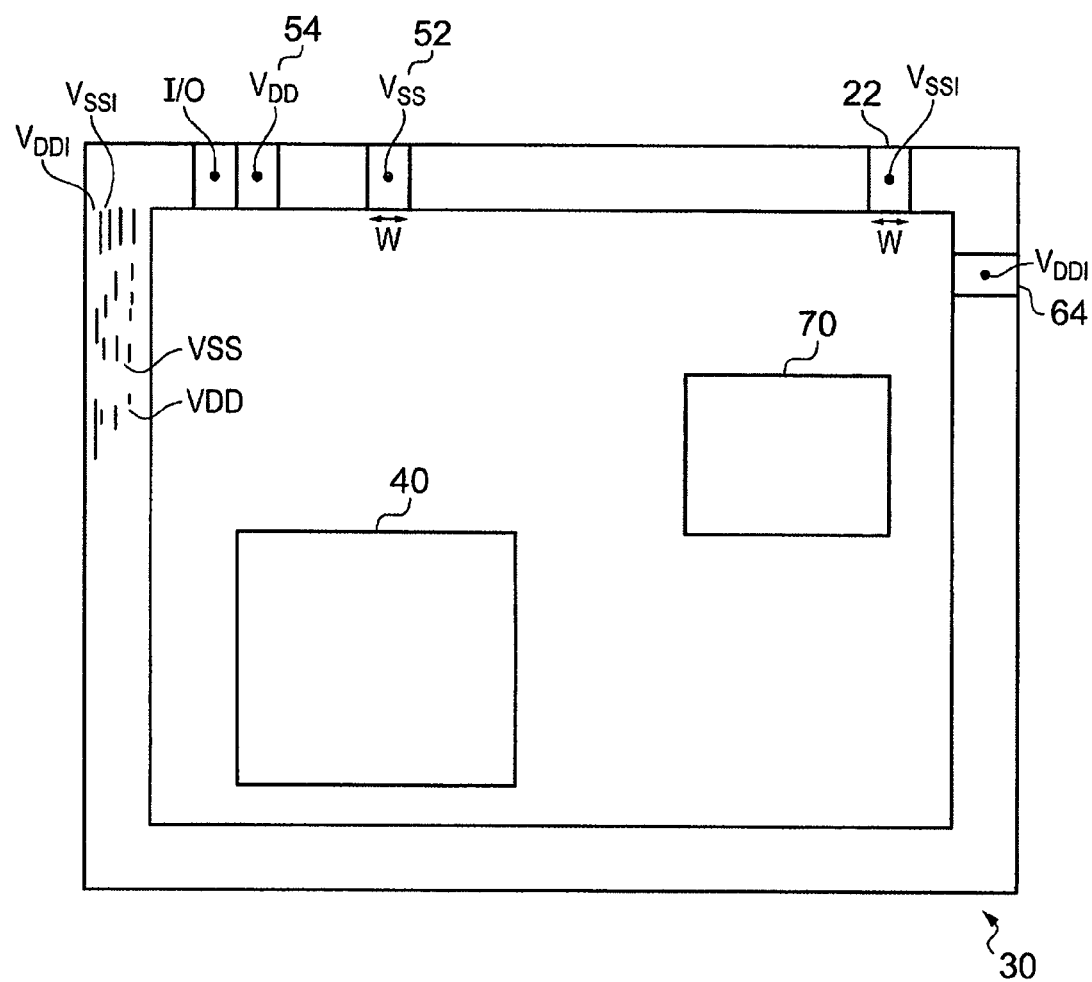
FIG. 7 shows an integrated circuit having a USB driving circuit and a processing core.

FIG. 7 shows schematically an integrated circuit 30 comprising a driving device 70 for a USB port and a processing core 40. There are two sets of power rails that run around the input output loop at a lower level, those that carry VDD and VSS and to those that carry VDD1 and VSS1. Power cells 52 and 54 supply VDD and VSS to the core 40, and power cells 62 and 64 supply a higher power level VDD1 and VSS1 to the USB driving cell.

Figure 8:
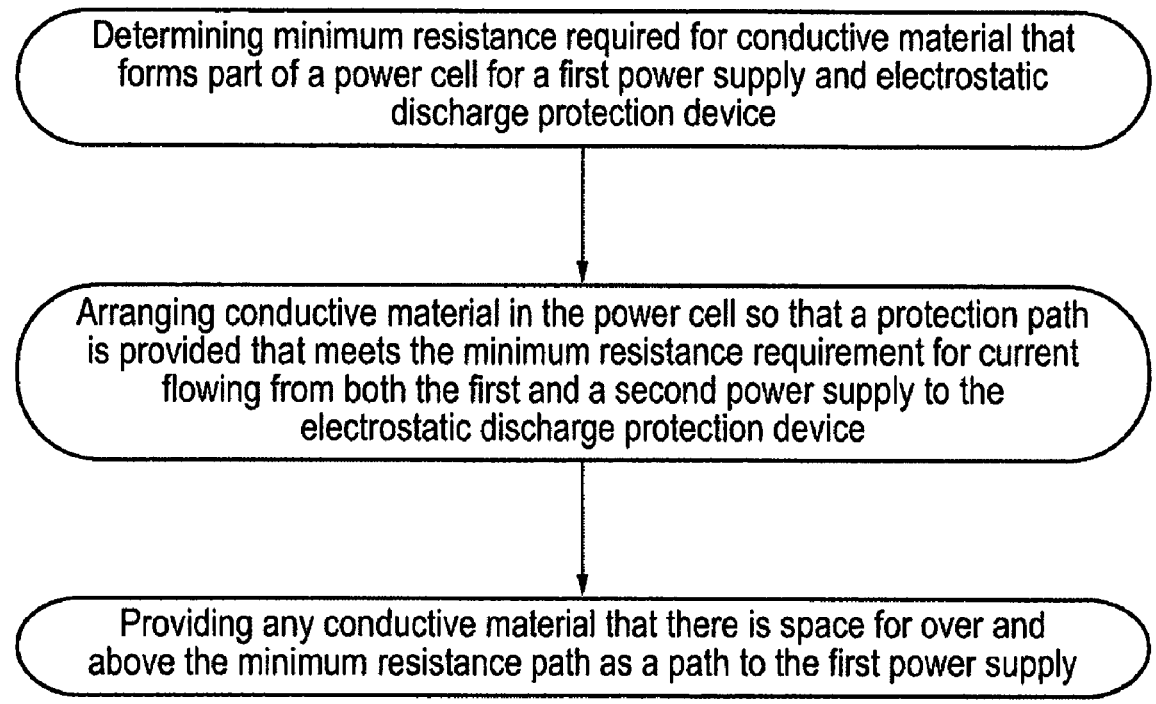
FIG. 8 shows a flow diagram illustrating a method of supplying power to an integrated circuit according to an embodiment of the present invention.

FIG. 8 shows a flow diagram illustrating a method of designing an integrated circuit according to an embodiment of the present invention so that power can be distributed from a first voltage supply to the integrated circuit. In this method it is first determined what the minimum resistance is that is needed to provide a sufficient protection path for surge current flowing in the electrostatic discharge protection device. When this has been determined it is determined how much conductive material can be placed in the cell and then this is arranged so that a sufficient protection path is provided and any extra current paths available in the conductive material are arranged as paths between the first power supply and the core, so that they are used as power supply paths to the core. In this way an integrated circuit is designed that has sufficient electrostatic discharge protection but also has maximum or at least increased power supply possibilities.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims. For example, various combinations of the features of the following dependent claims could be made with the features of the independent claims without departing from the scope of the present invention.

We claim:

1. A power supply cell for distributing power supplied from a first voltage supply to an integrated circuit, said power supply cell comprising:

a layer comprising conductive material, said conductive material providing a conduction path for current flowing from said first voltage supply to a portion of said integrated circuit to be powered and further providing a protection path for surge current flowing between said first voltage supply and an electrostatic discharge protection device and between said electrostatic discharge protection device and a second voltage supply;

said conductive material forming a first conduction path for providing a path for current flowing between said first voltage supply and said portion of said integrated circuit to be powered and for providing a portion of said protection path for surge current flowing between said first voltage supply and said electrostatic discharge protection device and a second conduction path for providing a further portion of said protection path for surge current flowing between said second voltage supply and said electrostatic discharge protection device; wherein said conductive material is arranged such that said first conduction path has a significantly lower resistance than said second conduction path.

2. A power supply cell according to claim 1, wherein said first conduction path has a resistance of between 10 and 90% of said second conduction path.

3. A power supply cell according to claim 1, wherein said first conduction path has a resistance of between 30 and 70% of said second conduction path.

4. A power supply cell according to claim 1, wherein said conductive material comprises a plurality of conductive strips, said first conduction path comprising more conductive strips than said second conduction path.

5. A power supply cell according to claim 1, wherein said conductive material comprises a plurality of conductive strips, said conductive strips having different widths, said second conduction path being formed of at least one conductive strip that is thinner than at least one of said conductive strips forming said first conduction path.

6. A power supply cell according to claim 5, wherein a width of said at least one conductive strip forming said second conduction path is selected to be narrow, but wide enough not to degrade when conducting said surge current.

7. A power supply cell according to claim 1, said conductive material being arranged such that a total resistance of said first conduction path and said second conduction path is less than a predetermined value such that electrostatic discharge protection is provided.

8. A power supply cell according to claim 1, wherein a width of said portion of said power supply cell comprising said conductive material is greater than a pitch width of said integrated circuit, said pitch width of said integrated circuit being a minimum distance between external connections to said integrated circuit.

9. A power supply cell according to claim 8, wherein said conductive material for providing said second conduction path takes up half or less than half said pitch width of said integrated circuit.

10. A power supply cell according to claim 1, wherein a portion of said integrated circuit to be powered comprises a core of said integrated circuit.

11. A power supply cell according to claim 1, wherein a portion of said integrated circuit to be powered comprises an input/output device.

12. A power supply cell according to claim 1, said power supply cell further comprising:
a bonding layer for receiving a conducting element for connecting with said first voltage supply;
a power rail layer comprising first and second conductive rails for connecting to said first and said second voltage supply respectively;
at least one layer comprising said electrostatic discharge protection device; wherein
said layer comprising said conductive materials is arranged between said power line layer and said at least one layer comprising said electrostatic discharge protection device, said first conduction path having connections to said bonding layer, said portion of said integrated circuit to be powered and said electrostatic discharge protection device and said second conduction path having connections to said second conductive rail.

13. A power supply cell according to claim 12, wherein said width of said outer surface of said bonding layer is equal to a pitch of said integrated circuit, and said width of said portion of said cell comprising said conductive materials is wider than said pitch.

14. An integrated circuit comprising a core and a power rail layer, said power rail layer comprising a first conductive rail for connecting to said first voltage supply and a second conductive rail for connecting to said second voltage supply said power rails running around an edge of said integrated circuit, said integrated circuit further comprising at least one power supply cell according to claim 8, said power supply cell being formed towards said edge of said integrated circuit and including a portion of said power rails, said first conductive rail connecting to said first voltage supply within said power supply cell.

15. An integrated circuit comprising a core and at least one power supply cell according to claim 1, and further comprising at least one power supply cell for supplying power from a second voltage supply to a portion of said integrated circuit to be powered, said power supply cell comprising:

a layer comprising conductive material, said conductive material providing a conduction path for current flowing from said first voltage supply to a portion of said integrated circuit to be powered and further providing a protection path for surge current flowing between said second voltage supply and an electrostatic discharge protection device and between said electrostatic discharge protection device and said first voltage supply;
said conductive material forming a third conduction path for providing a path for current flowing between said second voltage supply and said portion of said integrated circuit to be powered and for providing a portion of said protection path for surge current flowing between said second voltage supply and said electrostatic discharge protection device and a fourth conduction path for providing a further portion of said protection path for surge current flowing between said first voltage supply and said electrostatic discharge protection device; wherein
said conductive material is arranged such that said third conduction path has a significantly lower resistance than said fourth conduction path.

16. A method of distributing power supplied from a first voltage supply to an integrated circuit, said method comprising the steps of:
providing said integrated circuit with a layer comprising conductive material, said conductive material providing a conduction path for current flowing from said first voltage supply to a portion of said integrated circuit to be powered and further providing a protection path for surge current flowing between said first voltage supply and an electrostatic discharge protection device and between said electrostatic discharge protection device and a second voltage supply;
arranging said conductive material to form a first conduction path for providing a path for current flowing between said first voltage supply and said portion of said integrated circuit to be powered and for providing a portion of said protection path for surge current flowing between said first voltage supply and said electrostatic discharge protection device and a second conduction path for providing a further portion of said protection path for surge current flowing between said second voltage supply and said electrostatic discharge protection device such that said first conduction path has a significantly lower resistance than said second conduction path.

17. A power supply cell for distributing power supplied from a first voltage supply to an integrated circuit, said power supply cell comprising:
a layer comprising conductive material, said conductive material providing a conduction path for current flowing from said first voltage supply to a portion of said integrated circuit to be powered and further providing a protection path for surge current flowing between said first voltage supply and an electrostatic discharge protection device and between said electrostatic discharge protection device and a second voltage supply;
said conductive material forming a first conduction path for providing a path for current flowing between said first voltage supply and said portion of said integrated circuit to be powered and for providing a portion of said protection path for surge current flowing between said first voltage supply and said electrostatic discharge protection device and a second conduction path for providing a further portion of said protection path for surge current flowing between said second voltage supply and said electrostatic discharge protection device; wherein said conductive material is arranged such that said first conduction path has a significantly lower resistance than said second conduction path; and a width of said portion of said power supply cell comprising said conductive material is greater than a pitch width of said integrated circuit, said pitch width of said integrated circuit being a minimum distance between external connections to said integrated circuit.

* * * * *